United States Patent
DeHart

(10) Patent No.: US 8,099,953 B2
(45) Date of Patent: Jan. 24, 2012

(54) METHOD AND APPARATUS FOR CONTROLLING EXHAUST TEMPERATURE OF A DIESEL ENGINE

(75) Inventor: Ronald C. DeHart, Kernersville, NC (US)

(73) Assignee: Volvo Group North America, LLC, Greensboro, NC (US)

( * ) Notice: Subject to any disclaimer, the term of this patent is extended or adjusted under 35 U.S.C. 154(b) by 236 days.

(21) Appl. No.: 12/448,021

(22) PCT Filed: Dec. 14, 2007

(86) PCT No.: PCT/US2007/025787
§ 371 (c)(1),
(2), (4) Date: Jun. 4, 2009

(87) PCT Pub. No.: WO2008/082492
PCT Pub. Date: Jul. 10, 2008

(65) Prior Publication Data
US 2010/0043430 A1 Feb. 25, 2010

Related U.S. Application Data

(60) Provisional application No. 60/876,793, filed on Dec. 22, 2006.

(51) Int. Cl.
*F01N 3/02* (2006.01)
(52) U.S. Cl. .............................. 60/320; 60/295; 60/317
(58) Field of Classification Search .................. 60/280, 60/286, 295, 297, 315, 316, 317, 320
See application file for complete search history.

(56) References Cited

U.S. PATENT DOCUMENTS

| 4,889,098 A * | 12/1989 | Suzuki et al. ................. 123/678 |
| 6,637,204 B2 * | 10/2003 | Ellmer et al. ................... 60/606 |
| 7,793,495 B2 * | 9/2010 | Bradley et al. .................. 60/324 |
| 2004/0045286 A1 | 3/2004 | Hirooka |
| 2004/0226284 A1 * | 11/2004 | Kitahara et al. ............... 60/285 |
| 2005/0217253 A1 * | 10/2005 | Onodera et al. ............... 60/295 |
| 2005/0217267 A1 | 10/2005 | Tsuzuki |
| 2006/0096281 A1 * | 5/2006 | Huang .............................. 60/297 |
| 2009/0100826 A1 * | 4/2009 | Stewart et al. ................. 60/295 |
| 2009/0120066 A1 * | 5/2009 | VanderGriend et al. ........ 60/285 |

FOREIGN PATENT DOCUMENTS

| EP | 1491735 A1 * | 12/2004 |
| EP | 1630369 A2 * | 3/2006 |
| JP | 11107936 A | 4/1999 |
| JP | 2002255052 A | 11/2002 |

OTHER PUBLICATIONS

European Search Report dated Dec. 14, 2010 for corresponding application No. EP 07863026.6.

* cited by examiner

*Primary Examiner* — Thomas Denion
*Assistant Examiner* — Patrick Maines
(74) *Attorney, Agent, or Firm* — Martin Farrell; Michael Pruden

(57) ABSTRACT

An apparatus and method for cooling an exhaust gas flow of an internal combustion engine of a truck or other vehicle includes a conduit connected to an air source, for example, a turbo driven compressor to deliver air to the exhaust stack or tail pipe. The conduit is controlled by a valve, which is opened and closed by a controller responsive to a measured exhaust gas temperature above a threshold and a vehicle speed below a threshold. The invention is particularly advantageous for engine exhausts having aftertreatment devices that require high temperature regeneration.

5 Claims, 3 Drawing Sheets

METHOD AND APPARATUS FOR CONTROLLING EXHAUST TEMPERATURE OF A DIESEL ENGINE

This application claims the benefit of U.S. Provisional Patent Application No. 60/876,793, filed Dec. 22, 2006.

The invention relates to truck exhaust systems and methods and apparatus to dilute and cool exhaust gas before it is released into the environment.

BACKGROUND

Stringent emissions regulations such as those imposed by U.S. and European regulatory officials have progressively reduced the amount of diesel particulate matter (DPM) and other gaseous constituents allowed in the exhaust gases of diesel engines. The emissions levels proposed by the US07 and Euro 5 regulations are so low that they cannot be met without the use of exhaust aftertreatment devices. Diesel particulate filtration devices (DPF) and Diesel Oxidation Catalysts (DOC) are examples of devices which may be used to comply with particulate emissions levels.

DPFs filter the particulate matter from the exhaust gases to prevent them from exiting the tailpipe. After a period of operation, the collected particulates start to clog the filter. The filter either needs to be replaced or removed for cleaning, which is not practical, or it needs to be cleaned through a process known as regeneration. DPM is made up primarily of carbon, and is therefore combustible. Regeneration is a process where temperatures of the exhaust gases are made high enough to combust or oxidize the DPM within the filter. When engines are operated under higher loads the exhaust gas temperatures are generally high enough to cause at least some amount of regeneration without assistance. However, during light or short duration cyclic loads, or when ambient temperatures are low, the temperature of the exhaust gas is not high enough to produce regeneration. During these periods it is necessary to actively raise the exhaust gas temperature to facilitate regeneration or to increase exhaust gas temperatures to facilitate operation of other exhaust aftertreatment devices.

Methods for heating exhaust gas to a temperature sufficient for regenerating an aftertreatment device are known. For example, it is known to use a resistive electric heating element directly in the exhaust stream to increase exhaust gas temperature. It is also known to inject fuel into the exhaust and combust the fuel in a dedicated burner assembly to raise exhaust gas temperature. It is also known to inject a hydrocarbon into the exhaust gas and use a catalytic device that elevates exhaust gas temperature by catalytically oxidizing the injected hydrocarbon. An exhaust gas restriction device that applies an engine retarding load (braking load) to the engine can also be used to cause it to run at an elevated engine load condition, thus elevating the exhaust gas temperature. It is also known to elevate diesel particulate matter (DPM) temperatures by using microwaves.

The regeneration process can cause the temperature of the exhaust gas exiting the diesel particulate filter to be well in excess of 600° C. By comparison, normal operating exhaust temperature for a diesel engine depends on the load and can range from about 100° C. at idle to about 500° C. at high load.

At highway speeds, high exhaust temperatures do not usually pose problems because the relative high air speeds tend to dissipate the heat. Exhausting the higher temperature stream can create difficulties when the vehicle is stationary or moving at low speed and is near combustible materials. A truck typically has an exhaust stack pipe rising from the chassis adjacent to the truck cab. High temperature exhaust can produce a hot spot on the truck cab or trailer, or direct hot gases to a combustible substance, such as a building structure (for example, a loading dock or in a garage) or an overhanging tree.

It is desirable to provide an arrangement and a method for lowering the temperature of engine exhaust, particularly when the engine is operated at low loads to support regeneration of exhaust aftertreatment devices that does not involve complicated components or undue additional operating expense.

It is desirable at the same time to provide an arrangement that cools the exhaust gas exiting to the environment to avoid excess heat load on the surroundings.

SUMMARY OF THE INVENTION

The invention provides a method and apparatus for heating exhaust gases to support regeneration of an exhaust aftertreatment device while simultaneously cooling exhaust gases before the gases are dispersed to the atmosphere.

According to an aspect of the present invention, an engine having an engine exhaust temperature control arrangement includes an engine having an intake and an exhaust, an exhaust aftertreatment device disposed in an exhaust conduit, a compressor having an inlet and an outlet, a conduit between the compressor outlet and the engine intake, a secondary conduit between the compressor outlet and an outlet of the exhaust aftertreatment device, and a valve for controlling flow through the secondary conduit.

A compressor, for example, a mechanically-driven supercharger compressor or exhaust gas driven turbocompressor is connected by the conduit to deliver compressed air to the engine intake. According to the invention, a valve disposed in the second conduit connecting the outlet of a compressor to the exhaust downstream of an exhaust aftertreatment device is normally closed. A controller determines that a regeneration process is desired and/or senses a temperature of the exhaust exiting the aftertreatment device, and opens the valve to direct air to the exhaust stream. The compressed air both dilutes and cools the exhaust gas.

According to another aspect of the invention, the controller is configured to monitor the temperature of the exhaust gas exiting the exhaust aftertreatment device, and control the opening amount, or the opening and closing, of the valve toward generating a desired temperature. According to another aspect of the invention, the controller also is configured to monitor the engine speed and vehicle speed, and determine a desired temperature as a function of the engine speed or vehicle speed.

According to another aspect of the present invention, a method for controlling engine exhaust gas temperature comprises compressing charge air in a compressor, diverting a portion of the compressed gas from an outlet of the compressor to an outlet of the exhaust aftertreatment device such that compressed gas from the outlet of the compressor mixes with exhaust gases from the exhaust aftertreatment device to cool the gas flow, and directing a second portion of the compressed gas to the intake of the engine, wherein the reduced compressed air volume to the engine causes an increase in exhaust gas temperature.

According to yet another aspect of the present invention, a method for controlling engine operating temperature further comprises controlling an amount of the compressed gas that is circulated to the intake of the engine to maintain a desired engine operating temperature.

According to yet another aspect of the invention, a method for controlling engine operating temperature further comprises or alternatively comprises injecting a portion of fuel into exhaust gas entering the exhaust aftertreatment device to raise the temperature of the exhaust gas.

The invention also provides a method for cooling exhaust gases before exiting to the environment after the regeneration process is completed and while the aftertreatment device cools, comprising diverting a portion of the compressed air from an outlet of the compressor to an outlet of an exhaust aftertreatment device and providing a portion of the compressed air from the outlet of the compressor to the intake of the engine and controlling an amount of air and fuel to the intake of the engine so as to maintain a low engine temperature.

A method in accordance with the invention includes the steps of sensing an exhaust gas temperature exiting a diesel particulate filter, opening a valve on an outlet line of a turbocompressor to direct compressed air into the exhaust gas, sensing a temperature of the exhaust gas, and adjusting an opening of the valve to achieve an air volume to cool the exhaust gas to a desired temperature.

According to another aspect of the invention, the controller adjusts a variable geometry turbine to accommodate the change in air flow to the engine inlet.

BRIEF DESCRIPTION OF THE DRAWINGS

The invention will be better understood by reference to the following detailed description read in conjunction with the appended drawings, in which.

DETAILED DESCRIPTION

The invention relates to devices for cooling a truck exhaust before the exhaust gas is released to the surrounding air.

Figure 1:
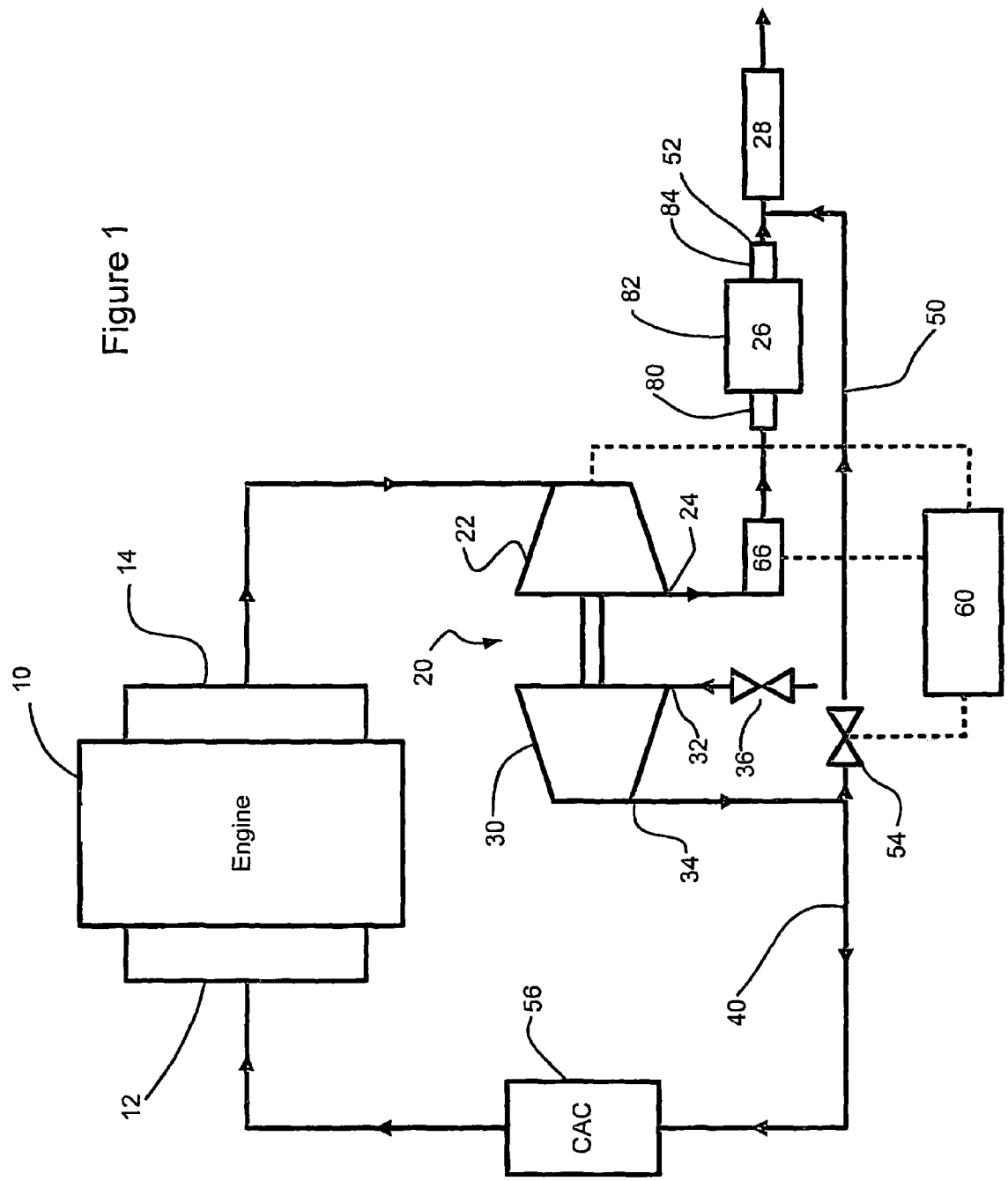
FIG. 1 is a simplified schematic diagram of an engine including an exhaust gas cooling arrangement in accordance with the invention.

An internal combustion engine 10 having an engine exhaust temperature control arrangement is shown in a simplified schematic view in FIG. 1. The engine 10 has an intake 12 and an exhaust 14. Typically, the intake 12 and the exhaust 14 will be in the form of intake and exhaust manifolds. The engine 10 can be any desired type of internal combustion engine; however, the present invention is presently contemplated as having particular application in connection with diesel engines.

A supercharger 20 is included to compress air for the engine intake 12. The supercharger 20 may be a mechanically-driven supercharger or an exhaust gas driven turbocompressor. Alternatively, the compressor can be a centrifugal compressor or positive displacement pump, which may be a component of a supercharger. As yet another alternative, the compressor may be a dedicated compressor or blower supplying air only to the exhaust cooling arrangement.

For purposes of illustration, an embodiment comprising a turbocharger is shown and described. An exhaust turbine 22 is connected to receive exhaust gas from the engine exhaust 14. Gas exhausted from the turbine 22 flows through an exhaust conduit 24 to an exhaust aftertreatment device 26, which for a diesel engine may include a diesel particulate filter (DPF). As is known, the DPF 26 removes particulate matter from the exhaust gas and the aftertreatment arrangement may include a catalyst to remove NOx products from the exhaust gas. The exhaust gas exits the DPF 26 and is exhausted to atmosphere through an exhaust stack pipe 28 or tail pipe.

While the aftertreatment device 26 is shown as a diesel particulate filter DPF in FIG. 1, the present invention may be applied to any number of aftertreatment devices instead of or in addition to a DPF. For example, the exhaust gas aftertreatment device 26 can include a diesel oxidation catalyst and/or a diesel NOx catalyst.

The exhaust stack pipe 28 may be configured as a diffuser or a combination diffuser/diluter as described in International Applications No. PCT/US2006/048888 or PCT/US2006/048956, both by Dickinson et al., and both filed 21 Dec. 2006, and owned in common with the present application, the contents of which are hereby incorporated by reference.

A compressor 30 of the turbocompressor 20 has an inlet 32 and an outlet 34. A charge air intake valve 36 is connected to the compressor inlet 32. A conduit 40 is provided between the compressor outlet 34 and the engine intake 12 to supply compressed air to the engine.

According to a first embodiment of the invention, a secondary conduit 50 is provided between the compressor outlet 34 and the stack pipe 28 on an outlet side 52 of the DPF 26. A valve 54 is provided for controlling flow through the secondary conduit 50. The DPF 26 and exhaust pipe 28 are shown as connected by a short conduit for the convenience of the illustration. The DPF 26 and exhaust pipe 28 may be connected directly. The cooling air flow conduit 50 is connected at a point spaced sufficiently far from the exhaust gas exit to allow mixing of the cooling air with the exhaust gas before the mixed gases exit to the environment.

The exhaust gas aftertreatment device 26 over time becomes clogged with particulate matter and must be cleaned. Regeneration, which is a process of heating the aftertreatment device to burn off or oxidize the collected matter, is becoming the method of choice for cleaning, particularly for diesel particulate filters, which collect combustible matter.

The exhaust gas aftertreatment device 26 can be operated for regeneration by introducing exhaust gas into the exhaust gas aftertreatment device at a temperature sufficiently high to cause combustion of the particulate matter collected in the filter. When the engine is operating at high load, for example, at highway speeds or climbing hills, the exhaust is typically at a sufficiently high temperature. At other operating conditions, however, the exhaust gas requires heating.

The temperature of the exhaust gas exiting the engine 21 is directly related to the amount of fuel burned, the amount of combustion air, and the inlet temperature of the combustion air when it is introduced to the engine. According to one embodiment of the invention, exhaust gas supplied to the aftertreatment device 26 may be heated for regeneration by controlling, that is, reducing, the amount of compressed air supplied to the engine intake 12, while simultaneously, the exhaust gas exiting the aftertreatment device is cooled by diluting it with air diverted from the compressor 30.

By diverting a portion of the compressed inlet air, the overall mass flow of inlet air being delivered to the engine 10 is reduced by the part of the total mass flow diverted to the DPF outlet 52. The reduced air mass raises the temperature of the combustion, and accordingly, the temperature of the exhaust gas.

In the engine 12 having an exhaust temperature control arrangement in accordance with the invention, air that has been compressed by the compressor 30 is divided between the conduit 40 supplying air to the engine intake 12 and the conduit supplying air to the outlet 52 of the DPF 26. The air flow can be controlled using the valve 54, such as to limit diverting air to those times when it is desirable to actively increase exhaust gas temperatures, for example, during regeneration of the DPF.

Other advantages of diverting compressed air from the engine intake for heating the engine and exhaust gas are described in International Patent Application No. PCT/US2006/01231 for "Engine with Exhaust Temperature Control and Method for Controlling Engine Exhaust Gas Temperature and Engine Intake Temperature," the contents of which are incorporated herein by reference.

A controller 60 can be provided to control opening and closing of the valve 54. It will be appreciated that references to "opening and closing" of valves encompasses opening and closing valves to less than fully open and less than fully closed as desired. The valves described here can be on/off type valves or valves that are capable of modulation to any number of positions between completely open and completely closed.

The controller 60 is connected to monitor the temperature of the exhaust aftertreatment device 26. For a DPF 26, as illustrated, typically three temperature sensors are provided. A first sensor 80 is disposed at an inlet of the DPF, a second sensor 82 is disposed downstream of a catalyst portion, and a third sensor 84 is disposed at the outlet 52 of the DPF.

A charge air cooler (CAC) 56 may be provided in the conduit 40 and the controller 60 can be adapted to control opening and closing of the valve 54 to control a temperature of gas exiting the charge air cooler. Further control of gas temperature downstream of the CAC 56 can be provided by providing a charge air cooler bypass arrangement (not illustrated). The charge air cooler bypass arrangement can comprise a line connected to the conduit 40 at points upstream and downstream, respectively, of the CAC 56 with a valve to control flow through the line.

Under some conditions, the exhaust gases heated by reducing charge air to the engine may not be at a temperature sufficiently high to support regeneration. To facilitate heating of the exhaust gas prior to the aftertreatment device 26, one or more supplemental or alternative exhaust gas heating assemblies 66, operable together with the controller 60, can be provided for heating exhaust gas downstream of the turbine 22 to an elevated exhaust gas temperature, such as a temperature at which regeneration of the aftertreatment device can occur. The supplemental exhaust gas heating assembly 66 can comprise one or more of a resistive heating element in the exhaust gas stream; a burner arrangement for injecting fuel into the exhaust gas stream and combusting it in a dedicated burner assembly; a hydrocarbon source, hydrocarbon injector, and a catalytic device, the catalytic device elevating exhaust gas stream temperatures by catalytically oxidizing injected hydrocarbon; an exhaust gas restriction device for applying an engine retarding load to cause the engine to run at an elevated load condition such that an exhaust gas stream having an elevated temperature is produced; and a microwave arrangement. The controller 60 is also connected to control the exhaust heater 66, if provided.

The controller 60 determines that a regeneration is required, based on an algorithm that may include accumulated engine running time, distance traveled, fuel consumed, pressure change across the DPF, or other factors as will occur to those skilled in the art, or receives a signal that a regeneration is needed. The controller 60 may also be configured to accept a manually generated signal to initiate regeneration. The controller 60 will check the temperature at the DPF inlet, downstream of the catalyst, and at the DPF outlet. If the temperatures are . . . sufficient to support regeneration, the controller will simply monitor conditions without taking further action. If increasing the exhaust gas temperature is necessary, the controller may initiate regeneration by opening the valve 54 to reduce charge air fed to the engine inlet 12 by diverting compressed air to the outlet 52 of the DPF 26. As explained above, this will raise the temperature of the exhaust gases leaving the engine exhaust 14. As the regeneration proceeds, the controller 60 will continue to monitor the temperatures and may increase the opening of the valve 54 to divert additional air. Alternatively or in addition, the controller 60 may initiate the supplemental heater 66 to additionally raise the temperature.

Regeneration is typically run for a set period of time. The controller will include a timer function to determine when regeneration is complete. Alternatively, the controller can monitor the pressure change across the DPF to determine when regeneration is complete.

During regeneration, the exhaust gas entering the DPF or other aftertreatment device is at an elevated temperature, and the diverted air will dilute and cool the gas before it exits the stack pipe 28. After regeneration is completed, the DPF, which has been heated to support regeneration, will require some time to cool given its relatively large thermal mass. The controller 60 will check the temperature at the outlet 54 of the DPF 26 and will check the engine speed and vehicle speed. A moving vehicle will dissipate hot exhaust gases by its movement. If the vehicle is traveling above a threshold speed which indicates that the vehicle is moving on a road or highway, the controller 60 will close the valve 54. The threshold speed may be, for example, 10 miles per hour for a long haul truck, but may be higher, for example 20 mph, for a vocational truck, which often operates in short cyclic bursts.

Engine speed can indicate whether sufficient air is being diverted to cool the exhaust gases. If the vehicle speed or engine speed indicates the vehicle is at idle or is traveling at a low speed such as below 5 mph, the controller 60 will keep the valve 54 open to continue to dilute and cool the exhaust gas. The controller 60 will also signal to the engine fuel supply and turbine control (for a variable geometry turbine) appropriate instructions to keep the exhaust gas temperature at a normal temperature, rather than elevated temperature for regeneration.

The controller 60 continues to monitor the exhaust gas temperature and engine and vehicle speeds while the DPF cools. The threshold temperature at which the controller 60 will close the valve 54 may be based on the engine speed and/or vehicle speed for acceptable conditions for releasing undiluted exhaust gas. The threshold temperature may be higher, for example, for moving vehicle than for a vehicle at idle or low speed.

The controller 60 will also monitor power demand on the engine. Because the air diverted from the engine to cool the exhaust gas is not available for running the engine, the engine power output is limited. If the demand exceeds a threshold, which will depend on engine rated power, the controller 60 will close the valve 54 to allow the engine to develop the demanded power.

A target exhaust gas temperature during regeneration which is becoming generally accepted is 246° C. to avoid combustion of material nearby the exhaust outlet. An amount of diluting compressed air necessary to produce this temperature in the exhaust gas is a function of the engine size and operating conditions, and the selection and control of diverting valve 54 will be made accordingly. As currently contemplated, a valve that can divert sufficient air to lower exhaust temperature at the DPF and cause the increase in engine exhaust temperature at the engine exhaust has a flow capacity of at least 0.14 kg per second.

The controller 60 may be configured to monitor the temperature at the outlet 52 of the DPF 26 to supply diluting cooling air during other conditions. For example, a truck coming off the highway may have high exhaust temperatures, particularly if a regeneration cycle has been run, and the DPF 26 may be at an elevated temperature. The controller 60 will monitor temperature at the outlet 52 of the DPF 26 and the engine speed and vehicle speed to determine if diluting air is needed, and will open the valve 54 and provide instructions to the fueling system and turbine as needed. The valve 54 can remain open for the time needed for the DPF to cool to an acceptable temperature, which may be determined by monitoring temperature at any or all of the temperature sensors integrated in the DPF, or as a predetermined time interval calculated to allow sufficient time for the DPF mass to cool.

Another example is during the use of power take off (PTO) equipment. PTO equipment is typically used in stationary or slow moving vehicles, which could raise heat dispersal situations. The controller 60 acts in this case based on temperature readings at one or more of the DPF inlet temperature sensor 80, catalyst temperature sensor 82, and DPF exhaust side temperature sensor 84, in the manner described above.

A lamp or visual indicator may be provided in the vehicle cab to alert a driver or operator that the exhaust temperature is above normal operating temperature. This may be in addition to an indicator for the regeneration operation.

In addition, a manual control may be provided to allow a driver or operator to start an exhaust gas cooling cycle. This may be desirable, for example, for a vocational truck, such as a concrete mixer, where operating the power takeoff device puts a load on the engine raising the exhaust gas temperature to a level unacceptable for local conditions. The operator can initiate cooling, and the controller 60 will operate as described above to provide diluting air to cool the exhaust gas temperature.

Control for initiating exhaust cooling during power take off device use may alternatively be generated by a signal delivered by the power takeoff device to the controller 60.

Figure 2:
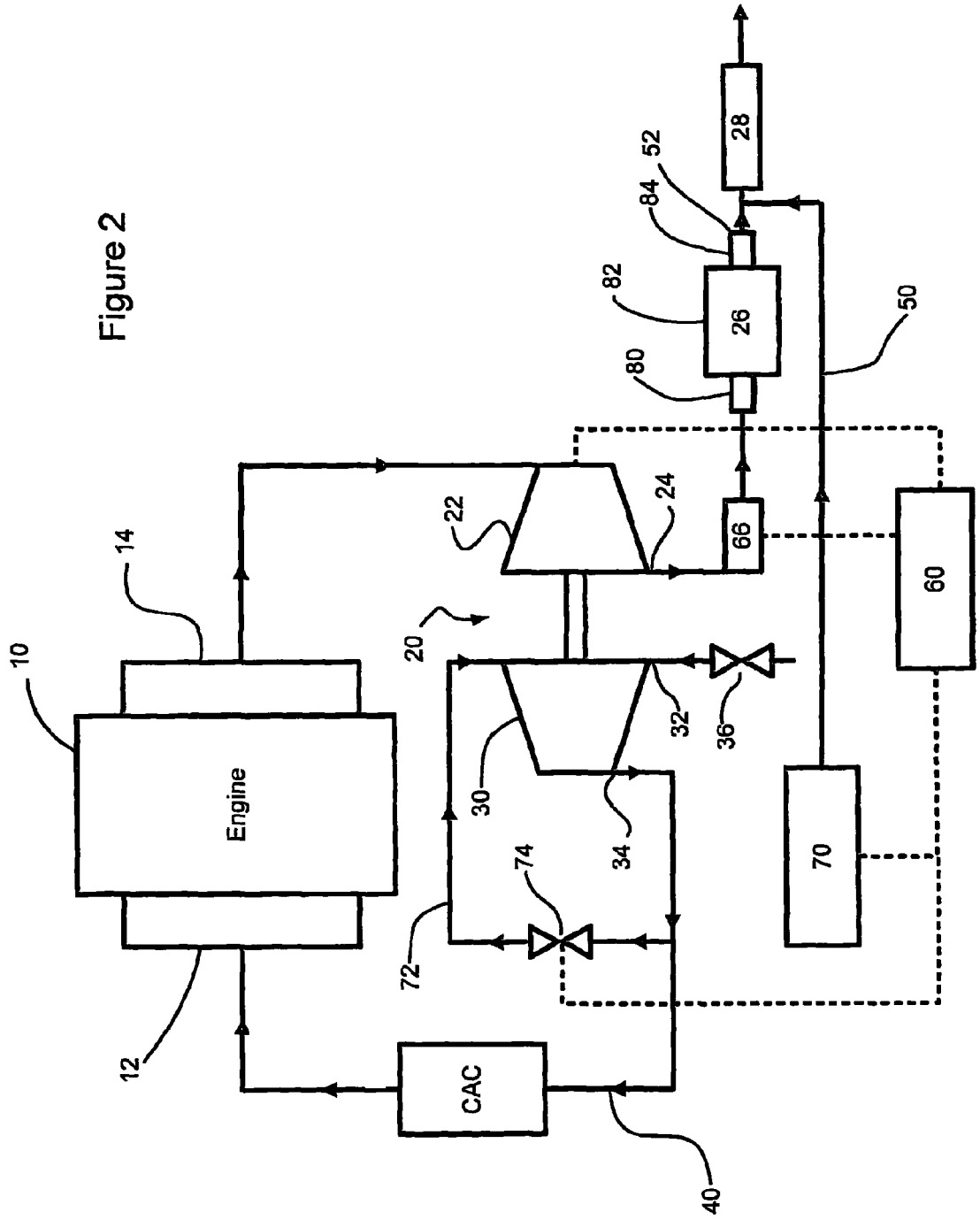
FIG. 2 is a schematic diagram of an engine including an exhaust gas cooling arrangement in accordance with an alternative embodiment of the invention.

According to an alternative embodiment, shown in FIG. 2, a dedicated blower or compressor 70 is connected by conduit 50 to deliver air to the exhaust gas exiting the DPF 26. The controller 60 will monitor temperatures at the DPF inlet 80, downstream of the catalyst 82 and at the DPF outlet 84 in the manner described above for activating the blower 70 to deliver air to the exhaust during high exhaust temperature situations as well as during regeneration, except that air from the compressor 30 is not diverted to the exhaust gas stream, either as part of the regeneration cycle or for cooling of the exhaust gas during other vehicle or engine operations. Accordingly, the controller 60 will take another measure as described, to heat the exhaust gases for DPF regeneration. The engine 10 in this embodiment may include a compressor recycling loop 72 for heating the exhaust gas as described in International Patent Application No. PCT/US2006/01231 for regeneration, with a valve 74 included to control the flow of compressor air being recycled to the inlet side of the compressor 30. The valve 74 is connected for control by the controller 60. In this embodiment, a heater assembly 66 may also be provided as the primary or secondary heat source for aftertreatment regeneration. In other respects for cooling the exhaust gases, the embodiment of FIG. 2 will act in the same manner as that described in connection with FIG. 1.

Figure 3:
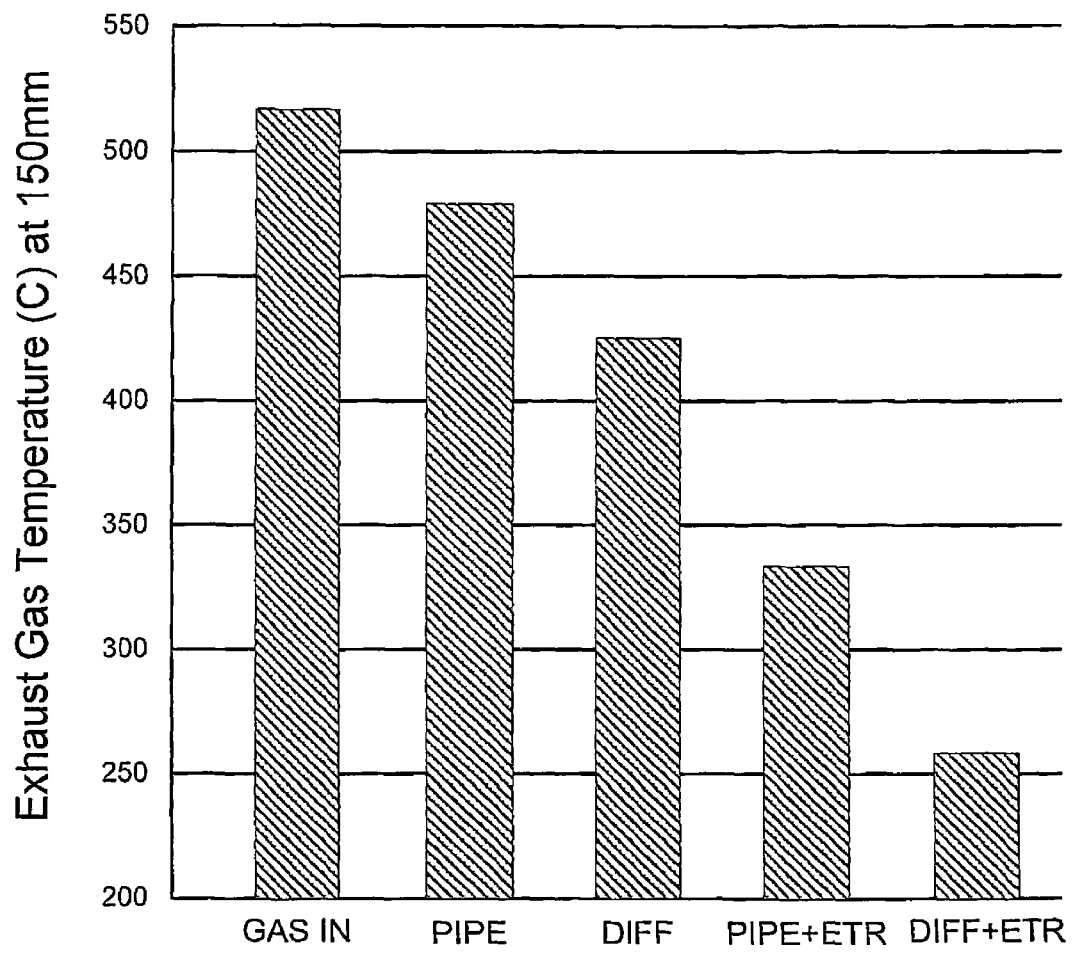
FIG. 3 is a graph showing the comparative effect on temperature of an apparatus in accordance with the invention.

FIG. 3 is a graphical representation of the effect of the present invention on exhaust gas temperature during regeneration as determined during testing. Temperature was measured at 150 mm from the outlet of the exhaust stack. "GAS IN" is the temperature at the inlet to the exhaust stack pipe of exhaust gas. "PIPE" is the outlet temperature of the exhaust gas exiting at the end of a conventional stack pipe. "DIFF" shows the temperature of the exhaust exiting a diffuser as disclosed in the aforementioned Dickinson et al. PCT/US2006/048888 application. The diffuser comprises a box mounted on the end of a stack pipe and having mesh walls to disperse exhaust gas over a larger space volume than provided by the pipe outlet alone. PIPE+ETR shows the temperature of exhaust gas from a conventional pipe with dilution by compressed air in accordance with the invention. DIFF+ETR shows the exhaust temperature when the diffuser is combined with compressed air dilution.

In the present application, the use of terms such as "including" is open-ended and is intended to have the same meaning as terms such as "comprising" and not preclude the presence of other structure, material, or acts. Similarly, though the use of terms such as "can" or "may" is intended to be open-ended and to reflect that structure, material, or acts are not necessary, the failure to use such terms is not intended to reflect that structure, material, or acts are essential. To the extent that structure, material, or acts are presently considered to be essential, they are identified as such.

While this invention has been illustrated and described in accordance with a preferred embodiment, it is recognized that variations and changes may be made therein without departing from the invention as set forth in the claims.

What is claimed is:

1. A method for cooling exhaust gas in an internal combustion engine having a particulate filter and a regeneration system for oxidizing particulate matter collected in the particulate filter, the method comprising the steps of:
    sensing a temperature of an exhaust gas flow at an outlet of the particulate filter;
    sensing a vehicle speed;
    directing a flow of air into the exhaust gas flow downstream of the particulate filter if the temperature is above a selected threshold temperature and the vehicle speed is below a selected speed; and,
    continuing the flow of air into the exhaust gas flow until the temperature is below a selected threshold temperature or the vehicle speed is above the selected speed.

2. The method of claim 1, further comprising controlling a volume of the flow of air responsive to a temperature measured in the exhaust gas flow.

3. The method of claim 2, wherein the flow of air is generated by a compressor driven by an exhaust turbine and the volume of the flow of air is controlled by controlling the engine speed.

4. The method of claim 2, wherein directing a flow of air is by opening a valve in an air supply line connected to the exhaust pipe, and wherein the volume of the flow of air is controlled by controlling the opening amount of the valve.

5. The method of claim 2, wherein the flow of air is generated by a blower and the volume of the flow of air is controlled by increasing a speed of the blower.

* * * * *